United States Patent Office 3,271,278
Patented Sept. 6, 1966

3,271,278
ELECTROLYTIC REDUCTIVE COUPLING OF
AROMATIC COMPOUNDS
Manuel M. Baizer, St. Louis, Mo., assignor to Monsanto
Company, St. Louis, Mo., a corporation of Delaware
No Drawing. Filed July 2, 1965, Ser. No. 469,350
16 Claims. (Cl. 204—72)

This application is a continuation-in-part of my co-pending application S.N. 163,028 filed December 29, 1961, and now Patent No. 3,193,476; and S.N. 189,072 filed April 20, 1962, and now Patent No. 3,193,477, both patents issuing on July 6, 1965.

This invention relates to the manufacture of polyfunctional compounds and provides a new and valuable electrolytic process for reductive cross-coupling of aryl ethylenes with other types of activated olefins.

A general object of the present invention is the provision of a process for preparing a variety of reductively cross-coupled products of alk-1-enyl arenes with other activated olefins. A further object is the provision of certain novel and useful classes of compounds which can conveniently be prepared by the aforesaid process.

The present process involves the electrolytic cross-coupling of compounds having ethylenic bonds in conjugated relationship to the unsaturated system of an aromatic ring with other activated olefin compounds, e.g., with alpha,beta olefinic ketones, carboxylates, carboxamides, nitriles, phosphonates, phosphinates, phosphine oxides and sulfones.

The process is illustrated:

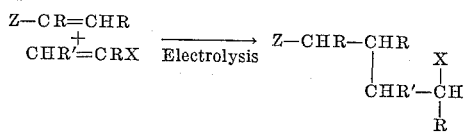

where Z is an aromatic radical attached at a nuclear ring position, and the Rs are individually selected from H or hydrocarbyl radicals, e.g., alkyl, alkenyl or aryl radicals, and R' is R or hydrocarbyloxy, e.g., alkoxy, or a carboxylate, carboxamido or cyano group, X is selected from

where R'' is a hydrocarbyl radical,

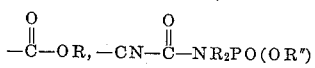

$P(O)R(OR)$, $P(O)R_2$, $SO_2$, or a pyridine ring radical attached at the 2- or 4-position, i.e., an even-numbered ring carbon atom. The aryl radicals can be those monovalent radicals obtained by loss of a nuclear hydrogen from an aromatic compound, i.e., those compounds whose molecules have the ring structure characteristic of benzene, naphthalene, phenanthrene, anthracene, etc., being either the six-carbon ring of benzene or the condensed rings of other aromatic derivatives. The aryl group can, for example, be phenyl, o-tolyl, p-tolyl, α-naphthyl, β-naphthyl, α,β- and γ-anthracyls, phenanthryls, etc. It is only necessary that the ethylene group be in conjugation with the unsaturation of the aromatic hydrocarbon system, as this tends to make the group more readily reducible by electrolysis. The position in the aromatic ring in the product will correspond to that in the reactant, and in general the coupling will occur on the ethylene carbon atom β to the aromatic group, although occasionally with particular compounds there will be additional or alternate coupling on the α-carbon atom, or possibly on other atoms of the conjugated system. The R substituents in both the aromatic reactant and the other activated olefin can be hydrogen, alkyl or aryl, e.g., hydrogen, methyl, ethyl, propyl, isopropyl, butyl, hexyl, phenyl, alpha-naphthyl, beta-naphthyl, 2-ethylphenyl, benzyl, phenylethyl, etc.

As R' in the above reaction, any of the foregoing Rs are suitable or, e.g., ethoxy, carbethoxy, cyano, etc., groups. Suitable activated olefins are, for example, acrylonitrile, ethyl acrylate, ethyl crotonate, ethyl beta-ethoxyacrylate, acrylamide, diethyl fumarate, diethyl vinylphosphonate, methyl vinyl sulfone, etc. Other examples of suitable activated olefins for use herein can be found in copending applications S.N. 333,647 filed December 26, 1963, and now Patent No. 3,193,481; S.N. 337,540 and S.N. 337,546 both filed January 14, 1964, and now Patents Nos. 3,193,482 and 3,193,483 respectively, all of the aforesaid patents issuing on July 6, 1965; and S.N. 255,221 filed January 31, 1963, in general any compounds suitable for electrolytic hydrodimerization being suitable for cross-coupling with aryl ethenes according to the present invention. The conditions taught in the referred-to applications are suitable for reductive coupling except for such changes as may be indicated for the purpose of directing the process to production of cross-coupled products.

Example 1

A catholyte was prepared from 19.6 grams of benzalfluorene, 41 grams of acrylonitrile, 25 grams of dimethylformamide and 65.9 grams of 83% aqueous methyltri-n-butylammonium p-toluene-sulfonate, the molar ratio of acrylonitrile:benzalfluorene being 10:1. A trace of hydroquinone was present as stabilizer. The anolyte in an Alundum cup to separate it from the catholyte in the cell was 20 grams of a 47% aqueous solution of the toluenesulfonate salt. The anode was platinum and a pool of mercury 55 square centimeters in area was employed as cathode. Electrolysis was conducted at a cathode voltage of −1.51 to −1.60 volts (vs. saturated calomel electrode) for a total of 3.67 ampere hours, with the current gradually falling off from the starting amperage of 2 amperes. The pH was kept at ca. 8 by gradual addition of 1.60 ml. of acetic acid. At the end of the run the mercury was separated and a small amount of solid was removed by filtration. After purification from hexane, it yielded 0.44 g. of 9-benzylfluorene, M.P. 134–135°. The original mother liquor was diluted with 200 ml. of water and extracted with four 50-ml. portions of methylene chloride. The extracts were washed and then dried over Drierite. Volatile materials were removed on the water bath using an aspirator. The residual amber sirup weighed 53.5 g.; the excess weight was due to quaternary ammonium salt which had been extracted along with product. The sirup was washed by decantation first with water and then with ethanol. From a methanol solution of the insoluble portion there was obtained 0.9 g. and from the ethanol solution 0.7 g. of 9-benzylfluorene. The combined ethanol-methanol mother liquors were evaporated to dryness. The residue was dissolved in 200 ml. of methylene chloride and purified by passage through a column of activated alumina, which retained the quaternary salt impurity. The effluents yielded 21.4 g. (76.4% based on current input) of crude sirupy 9-β-cyanoethyl-9-(3-cyano-1-phenylpropyl) fluorene. Trituration with ether caused crystallization. Recrystallization from methanol provided the white analytical sample, M.P. 126–127°.

*Analysis.*—Calcd. for $C_{26}H_{22}N_2$: C, 86.15; H, 6.12; N, 7.73. Found: C, 85.66; H, 6.08; N, 7.95.

The structure was confirmed by proton magnetic resonance spectrum which showed the absence of a proton on the 9-position of the fluorene nucleus (δ–4.2)

utilizing 9-benzylfluorene, which has such proton, for comparison. Thus the reductive coupling has occurred with the result that a β-cyanoethyl group has added at the 9-position of the fluorene ring as well as on the aliphatic carbon of the benzyl group. No hydrodimers of the monomeric compounds were found.

*Example 2*

Electrolysis was conducted in accordance with the procedure of Example 1, with a catholyte containing 26.4 grams of 9-benzalfluorene, 58.9 grams of dimethylformamide and 82.6% aqueous methyltri-n-butylammonium p-toluenesulfonate. The anolyte was 20 grams of a 47% aqueous solution of the same salt. An average of 2.0 amperes was passed in for 1 hour at a cathode voltage of —1.5 to —1.6 volts (vs. saturated calomel electrode). The pH was moderated by the addition of ca. 3 ml. of acetic acid in the course of the run. Product began precipitating after the first 30 min. At the end of the run the mercury was separated and the product (11.5 g.) was removed by filtration and dried in vacuo, M.P. 310–313°. Recrystallization from anisole raised the melting point to 319–320° C., thus identifying the hydrodimerization product as 1,2-diphenyl-1,2-bis(9-fluorenyl) ethane of known melting point reported as 321° C. An additional gram of product was isolated from the filtrate. The yield, based on current expended, was 66%.

*Example 3*

A 10:1 molar mixture of ethyl acrylate and benzalfluorene was electrolyzed, the catholyte containing 10.9 grams of benzalfluorene, 42.6 grams of ethyl acrylate, 27.8 grams of dimethylformamide and 61.8 grams of 86.5% aqueous tetraethylammonium p-toluenesulfonate. The anolyte was 20 grams of a 60% aqueous solution of the same sulfonate salt. Electrolysis proceeded at a controlled voltage of —1.50 to —1.55 (vs. saturated calomel electrode). The amperage was gradually reduced from 1.0 to 0.10 amp., total 2.1 amp. hr. Acetic acid (1.70 ml.) was used to maintain the pH at ca. 8. The catholyte was then diluted with water, the mercury was separated, and 6.5 g. of 9-benzylfluorene, M.P. 133–134°, was removed by filtration. The mother liquor was extracted with four 50-ml. portions of methylene chloride. The extracts were washed and dried over Drierite. Volatile materials were removed on the water bath using an aspirator. The residue (5.4 g. of brown solid) yielded 2.2 g. of 9-benzylfluorene on fractional crystallization from methanol. The mother liquor was evaporated, and the residue was dissolved in methylene chloride and purified through alumina. The 2.04 g. of sirup obtained from the eluates was distilled; B.P. 204° (0.4 mm.), and identified as 9-(3-carbethoxy-1-phenyl-propyl)fluorene.

*Analysis.* — Calcd. for $C_{25}H_{24}O_2$: C, 84.23; H, 6.78. Found: C, 83.78; H, 6.79. The infrared spectrum was consistent with the indicated compound.

*Example 4*

Acrylonitrile and 8,8-diphenylbenzofulvene in a 10:1 molar ratio were electrolyzed in a catholyte containing 11.5 grams of the fulvene, 23.1 grams acrylonitrile, 82.3 grams of dimethylformamide and 27.6 grams of 90.5% aqueous tetraethylammonium p-toluenesulfonate. The anolyte was 20 grams of 60% aqueous solution of the salt. Electrolysis was conducted at —1.5 to —1.6 volts (vs. saturated calomel electrode). The amperage was gradually reduced from a high of 1.80 to 0.20 amp., total 2.27 amp.-hr. Acetic acid (1.80 ml.) was used for pH control. At the end of the run the mercury was separated and the brown-red catholyte was run dropwise with stirring into 300 ml. of water. The light yellow precipitate, after air drying overnight, weighed 29.0 g. It was extracted in a Soxhlet with methylene chloride for 11 hr. The insoluble portion was polyacrylonitrile; the soluble material (10.8 g.), an amber sirup, was dissolved in methylene chloride and purified by passage through a column of activated alumina. The effluents were taken to dryness, the residue was digested with methanol, and the suspension was cooled at room temperature and filtered. For analysis a sample was dissolved in acetonitrile and filtered. Addition of methanol precipitated white crystals, M.P. 172–173°.

*Analysis.*—Calcd. for $C_{31}H_{27}N_3$: C, 84.32; H, 6.16; N, 9.52. Found: C, 84.07; H, 6.27; N, 9.57.

The compound was that resulting from reductive coupling with acrylonitrile not only on the carbon atom of the ethylenic bond, i.e., at the 8-position, but also reductive coupling of two acrylonitrile molecules on the 5-membered ring to produce

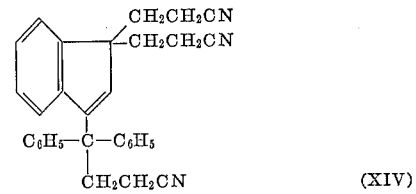

$$(XIV)$$

The proton magnetic resonance was determined and showed a singlet δ–6.22 for the olefinic proton in the 5-membered ring, indicating the illustrated compound rather than an isomer in which the proton would have appeared as a multiplet.

*Example 5*

2-phenyl-1,3-butadiene, 66.6 grams in a catholyte of 73.5 grams tetramethylammonium p-toluenesulfonate, 4.9 grams water and 114.5 grams dimethylformamide was electrolyzed at a current of about 2 amperes for 12 ampere-hours. The cathode voltage was —2.0 volts (vs. saturated calomel electrode). The catholyte was diluted with water and extracted with methylene chloride, and lower boiling products were separated to leave 13 grams of residue. A solution of the residue in methylene chloride was analyzed by vapor phase chromatography and found to contain the hydrodimer, 4,6-diphenyl-2,6-octadiene, among other components. The hydrodimer was separated by chilling the solution to obtain crystals which were then recrystallized from ethanol, M.P. 71.5–73° C.

*Analysis.*—Calcd. for $C_{20}H_{22}$: C, 91.60; H, 8.40; mol. wt., 262. Found: C, 91.60; H, 8.49; mol. wt., 262. The infrared spectra had absorptions at 1640 and 833 cm.$^{-1}$ characteristic of trisubstituted olefins.

*Example 6*

A catholyte was prepared from 53 grams tetraethylammonium p-toluenesulfonate, 18 grams water, 13 grams 2-phenyl-1,3-butadiene and 53 grams acrylonitrile, and a trace of p-nitrosodimethylaniline was added. The anolyte was 16 ml. of a 40% solution of the same salt. The solution was electrolyzed at circa —1.9 volts (vs. saturated calomel electrode) and a current of about 3 amperes for 11.4 ampere-hours. The catholyte was diluted with water and extracted with methylene chloride. Low boiling material was separated by distillation followed by some adiponitrile. The residue was fractionated by distillation, with fractions being taken at 122° C./0.30 mm., $n_D^{25}$ 1.4800, and 144.5° C./0.15 mm. Of the first fraction, 61.2% appeared in a peak on vapor phase chromatographic analysis and the peak material was indicated by infrared analysis to be the mixed reductive coupling product, 6-cyano-3-phenyl-hexene-1, and similarly 31.9% of the other fraction appeared in a peak which infrared analysis indicated to be the stated product. Some hydrodimer of the phenyl butadiene was also found in the latter fraction, appearing in a peak in the chromatographic analysis.

The above examples are illustrative of the present process and the cross-couplings of the activated olefinic compounds set forth herein can be conducted under the same conditions or numerous variations thereof. In addition the procedures and principles of my copending application S.N. 163,028 now Patent No. 3,193,476 can be employed herein.

While high concentrations of the reactants are readily obtained with some salts, concentrations can be increased by using a polar solvent along with the water in the aqueous solutions, e.g., acetonitrile, dioxane, ethylene glycol, dimethylformamide, dimethylacetamide, ethanol or isopropanol in addition to the salts.

It will be recognized that the term "coupling" as employed herein refers to the joining together of two different compounds.

Electrolysis, of course, has been practiced for many years and numerous materials suitable as electrolytes are known, making it within the skill of those in the art in the light of the present disclosure to select electrolytes for reductive coupling according to the present invention. In general, any electrolytes suitable for hydrodimerization of the individual olefinic compounds are suitable for employment in reductive coupling reactions of such compounds. As discussed in my aforesaid copending applications, some olefinic compounds are subject to polymerization or other side reactions if the electrolyte is acidic, or excessively alkaline, and it will be necessary in such cases to conduct the reductive coupling in non-acidic solution, and in some cases below a pH at which undesirable side reactions occur, e.g., below about 9.5.

In effecting the reductive coupling of the present invention it is preferred to utilize a cathode having an overvoltage greater than that of copper and to subject to electrolysis in contact with such cathode a concentrated solution of a mixture of the defined olefinic compounds in an aqueous electrolyte under mildly alkaline conditions. In effecting the reductive couplings of the present invention, it is essential to obtain cathode potentials required for such couplings and therefore the salt employed should not contain cations which are discharged at substantially lower, i.e., less negative, cathode potentials. It is desirable that the salt employed have a high degree of water solubility to permit use of very concentrated solutions for concentrated salt solutions dissolve greater amounts of the organic olefinic compounds.

In addition to the foregoing considerations, a number of other factors are important in selecting salts suitable for good results. For example, it is undesirable that the salt cation form an insoluble hydroxide at the operating pH, or that it discharge on the cathode forming an alloy which substantially changes the hydrogen overvoltage and leads to poorer current efficiencies. The salt anion should not be lost by discharge at the anode with possible formation of by-products. If a cell containing a separating membrane is used, it is desirable to avoid types of anions which, in contact with hydrogen ions present in the anolyte chamber, would form insoluble acids and clog the pores of the membrane.

In general amine and quaternary ammonium salts are suitable for use in the present process. Certain salts of alkali and alkaline earth metals can also be employed to some extent, although they are more subject to interfering discharge at the cathode and the alkaline earth metal salts in general tend to have poor water solubility, making their use inadvisable. It will be realized that the coupled products will be accompanied by varying amounts of hydrodimerization products, depending upon the particular olefin pairs involved and the conditions of the electrolysis. The production of hydrodimerization products is not necessarily detrimental, as many of them are useful. However, it will often be desired to direct the process toward preferential production of the coupled product. This can be done by regulating the cell voltage so that the electrolysis occurs at a cathode potential close to that for reduction of the monomer requiring the lowest voltage, i.e., the least negative voltage. This is particularly effective if the voltage for the more readily reducible monomer is appreciably lower than that for the other monomer, for example, 0.3 volt or more below that for the other monomer. In such cases, if the electrolysis is conducted at a cathode potential just sufficiently higher than that required for the more easily reducible monomer to achieve a practical reaction rate, there is very little if any hydrodimerization of the more difficultly reducible monomer, and the products are those resulting from coupling of the two monomers, or hydrodimerization of the more easily reducible monomer. It is possible to minimize the hydrodimerization of the more easily reducible monomer by "swamping" the mixture with the other monomer, employing only enough of the easily reducible monomer to keep the cathode potential at a value near that for reduction of the easily reducible monomer. It may be desirable to utilize small amounts of the easily reducible monomer and continuously or incrementally add such monomer as it is used up thereby achieving such swamping of the mixture in which large amounts of the other monomer are present compared to the easily reducible monomer.

Aryl ethenes which can be utilized in the coupling process of the present invention include, for example, styrene, stilbene, 1-phenyl-1,3-butadiene, 2-phenyl-1,3-butadiene, 9-benzafluorene, 8,8-diphenylbenzofulvene, 1,1-diphenylethene, 1,4-diphenylbutadiene, p-biphenyl-1,3-butadiene, etc. 9-benzafluorene is an example of an aryl hydrocarbon which can conveniently be used as a donor, having a cathode discharge potential of $-1.5$ to $-1.6$ volts (vs. saturated calomel electrode). Similarly, 8,8-diphenylbenzofulvene has a discharge potential circa $-1.5$ to $-1.6$ volts (vs. saturated calomel electrode). 2-phenyl-1,3-butadiene has a cathode discharge potential of $-2.0$ volts (vs. saturated calomel electrode) being similar to stilbene in this regard, which makes these compounds more useful as acceptors than donors in the present process. Styrene, which discharges circa $-2.35$ volts (vs. saturated calomel electrode) would require special care to hydrodimerize, particularly with regard to insuring that the supporting salt had a sufficiently negative discharge potential and was free of contaminants discharging at less negative voltages. However, styrene can take part as an acceptor in a cross-coupling process according to the present invention with suitable donor compounds.

In another aspect, the present invention involves the electrolytic hydrodimerization of such aryl ethenes as 9-benzalfluorene and 2-phenyl-1,3-butadiene, and a general process for electrolytically hydrodimerizing aryl ethenes in aqueous solution with supporting electrolyte salt, preferably with high concentrations of both the aryl ethenes and salt.

Various interesting compounds can be produced by the present process. For example, 2- and 4-vinyl pyridines hydrodimerize at cathode potentials circa $-1.4$ to $-1.5$ volts (vs. saturated calomel electrode) and can be cross-coupled with aryl ethenes.

The following table includes various olefins which can be electrolytically coupled with aryl ethenes, although it will be desirable for good yields to select those differing considerably in required cathode potential from the selected aryl compound.

| Monomer | $-E$ vs. Saturated Calomel Electrode |
|---|---|
| $CH_2=\overset{CH_3}{\underset{\|}{C}}-CN$ | 1.81 to 1.91. |
| $CH_3CH=CHCN$ | 2.08 to 2.11. |
| $(CH_3)_2C=CHCN$ | 2.01 to 2.05. |
| $(CH_3)_2C=\overset{CH_3}{\underset{\|}{C}}-CN$ | Ca. 2.15. |
| $C_6H_5CH=CHCN$ | 1.42 to 1.60. |

| Monomer | −E vs. Saturated Calomel Electrode |
| --- | --- |
| CHCN<br>‖<br>NCCH | 1.00 to 1.03. |
| CH₂=CH—CH—CHCN | 1.42 to 1.50. |
| 1-cyano-cyclohex-1-ene | 2.15 to 2.20. |
| 1-cyano-cyclopent-1-ene | 2.13. |
| CH₂=CHCOOEt | 1.85. |
| Me₂C=CHCOOEt | 2.10 to 2.18. |
| C₆H₅CH=CHCOOEt | 1.57 to 1.61. |
| C₂H₅OCH=CHCOOEt | 2.22. |
| CHCOOEt<br>‖<br>CHCOOEt | 1.32 to 1.40. |
| CHCOOC₈H₁₇<br>‖<br>CHCOOC₈H₁₇ | 1.41. |
| CHCOOC₄H₉<br>‖<br>CHCOOC₄H₉ | 1.30. |
| CHCOOC₈H₁₇<br>‖<br>C₁₈H₁₇OOCCH | 1.22. |
| C₆H₅CH=C(COOEt)₂ | 1.38 to 1.47. |
| CH₃CH=C(COOEt)₂ | 1.41 to 1.68. |
| CH₃CH=CH—CH=CHCOOEt | 1.50 to 1.59. |
| CH₂=CHCONEt₂ | 1.91 to 1.95. |
| CH₃CH=CHCONEt₂ | 2.03 to 2.12. |
| CH₂CHCONH₂ | 1.82 to 2.00. |
| C₆H₅CH=CHCONEt₂ | 1.67 to 1.73. |
| C₆H₅CH=CHCOCH₃ | 1.29. |
| (CH₃)₂C=CHCOCH₃ | 1.58 to 1.73. |

For the electrolysis of the present invention, the activated olefins are dissolved in a solution to be employed as catholyte. In general, the electrolytic reductive coupling is conducted in concentrated solution in an aqueous electrolyte. It is desirable to employ fairly concentrated solutions in order to minimize undesired reactions of intermediate ions with the water of the electrolyte. The olefinic reactants will comprise at least 10% by weight of the electrolyte, and preferably at least 20% by weight or more. It is generally desirable to employ fairly high concentrations of salts in the electrolyte, for example constituting 30% or more by weight of the total amount of salt and water in the electrolyte, in order to obtain the desired solubility of the olefinic compounds.

An electrolytic cell having a cathode of high hydrogen overvoltage is charged with the thus prepared solution and an electric current is passed through the cell to effect the reductive coupling reaction. Depending upon the concentration of the olefinic compound and upon the hydrogen ion concentration of the solution there may or may not be formed products other than the coupled products and saturated dimers. Thus, when working with concentrations of olefinic compound which are less than 10% or from 10 to 20% by weight of the solution, there may be formed compounds such as the reduced monomers or other condensation products. With acrylonitrile as a reactant, for example, propionitrile and/or bis(2-cyanoethyl) ether may thus be obtained as by-products. The solution should have a pH of 7 or above, i.e., the solution should be basic.

During electrolysis in a divided cell, alkalinity increases in the catholyte. However, the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte, when employing a diaphragm, may thus be realized by purposely leaking acid from the anolyte into the catholyte. It can also be achieved, of course, by extraneous addition to the catholyte of an acid material, e.g., glacial acetic acid, phosphoric acid or p-toluenesulfonic acid. Alkalinity may also be controlled, whether or not a diaphragm is used in the cell, by employing buffer systems of cations which will maintain the pH range while not reacting at the reaction conditions.

When the olefinic compounds include a carboxylate, the pH of the solution should not be allowed to rise to the point where substantial hydrolysis of the ester occurs. Since the lower alkyl esters, i.e., the methyl or ethyl esters, are usually more readily hydrolyzed than the higher alkyl esters, the optimum pH will vary with the nature of the ester. When the olefinic compounds include acrylonitrile, it will be desirable to maintain the pH at substantially below 9.5 in order to avoid or substantially minimize cyanoethylation. Otherwise, substantial quantities of bis(beta-cyanoethyl) ether are obtained. Similarly, when other olefinic nitriles are employed, it will be necessary to maintain the pH low enough to substantially minimize addition of water to the double bond.

Among the salts which can be employed according to the invention for obtaining the desired concentration of dissolved olefinic compound, the amine and quaternary ammonium salts are generally suitable, especially those of sulfonic and alkyl sulfuric acids. Such salts can be the saturated aliphatic amine salts or heterocyclic amine salts, e.g., the mono-, di- or trialkylamine salts, or the mono-, di- or trialkanolamine salts, or the piperidine, pyrrolidine or morpholine salts, e.g., the ethylamine, dimethylamine or triisopropylamine salts of various acids, especially various sulfonic acids. Especially preferred are aliphatic and heterocyclic quaternary ammonium salts, i.e., the tetraalkylammonium or the tetraalkanolammonium salts or mixed alkyl alkanolammonium salts such as the alkyltrialkanolammonium, the dialkyldialkanolammonium, the alkanotrialkylammonium or the N-heterocyclic N-alkylammonium salts of sulfonic or other suitable acids. Further specific examples of suitable amine and ammonium cations will be given below in setting forth specific salts suitable for use in the present invention. The saturated aliphatic or heterocyclic quaternary ammonium cations in general have suitably high cathode discharge potentials for use in the present invention and readily form salts having suitably high water solubility with anions suitable for use in the electrolytes employed in the present invention. The saturated, aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed; (and also by aryl sulfonate anions).

Among the anions useful in the electrolytes employed in the present process, the aryl and arkaryl sulfonic acids are especially suitable, for example, salts of the following acids: benzensulfonic acid, o-, m- or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4- or 5-sulfonic acid, mesitylene-2-sulfonic acid, durene-3-sulfonic acid, pentamethylbenzenesulfonic acid, o-dipropylbenzene-4-sulfonic acid, alpha- or beta- naphthalenesulfonic acid, o-, m- or p-biphenylsulfonic acid, and alpha-methyl-beta-naphthalenesulfonic acid. As explained heretofore, alkali metal salts are useful in the present invention with certain limitations, and the alkali metal salts of such sulfonic acids can be employed, i.e., the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate, or potassium pentamethylbenzenesulfonate. The salts of such sulfonic acids may also be the saturated, aliphatic amine or heterocyclic amine salts, e.g., the mono-, di- or trialkylamine salts, or the mono-, di- or trialkanolamine salts, or the piperidine, pyrrolidine, or morpholine salts, e.g., the ethylamine, dimethylamine or triisopropylamine salt of benzenesulfonic acid or of o-, p- or m- toluenesulfonic acid; the isopropanolamine, dibutanolamine or triethanolamine salt of o-, p- or m-toluenesulfonic acid or of o-, p- or m-biphenylsulfonic acid; the piperidine salt of alpha- or beta-naphthalenesulfonic acid or of the cumenesulfonic acids; the pyrrolidine salt of o-, m- or p-amylbenzenesulfonate; the morpholine salt of benzenesulfonic acid, of o-, m- or p-toluenesulfonic acid, or of alpha- or beta-naphthalenesulfonic acid, etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g., tetraethylammonium o- or m-toluenesulfonate or benzenesulfonate; tetraethylammonium o-, m- or p-cumenesulfonate or o-, m- or p-ethylbenzenesulfonate, tetramethylammonium benzenesulfonate, or o-, m- or p-toluenesulfonate; N,N-di-methylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalenesulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate or o-, m- or p-hexylbenzenesulfonate, tetrapentanolammonium p-cymene-3-sulfonate or benzenesulfonate; methyltriethylamminium o-, m- or p-toluenesulfonate or mesitylene-2-sulfonate; trimethylethylammonium o-xylene-4-sulfonate or o-, m- or p-toluenesulfonate; triethylpentylammonium alpha- or beta-naphthalenesulfonate or o-, m- or p-butylbenzenesulfonate, trimethylethanolammonium benzenesulfonate or o-, m- or p-toluenesulfonate; N,N-di-ethylpiperidinium or N-methyl-pyrrolidinium o-, m- or p-hexylbenzenesulfonate or o-, m- or p-toluenesulfonate, N,N-di-isopropyl or N,N-di-butylmorpholinium o-, m- or p-toluenesulfonate or o-, m- or p-biphenylsulfonate, etc.

The tetraalkylammonium salts of the aryl or alkarylsulfonic acids are generally preferred for use as the salt constituents of the electrolysis solution because the electrolyses in the tetraalkylammonium sulfonates are exclusively electrochemical processes.

Among the ammonium and amine sulfonates useful as electrolytes in the present invention are the alkyl, aralkyl, and heterocyclic amine and ammonium sulfonates, in which ordinarily the individual substituents on the nitrogen atom contain no more than 10 atoms, and usually the amine or ammonium radical contains from 3 to 20 carbon atoms. It will be understood, of course, that di- and polyamines and di- and poly-ammonium radicals are operable and included by the terms amine and ammonium. The sulfonate radical can be from aryl, alkyl, alkaryl or aralkyl sulfonic acids of various molecular weights up to for example 20 carbon atoms, preferably about 6 to 20 carbon atoms, and can include one, two or more sulfonate groups.

Another especially suitable class of salts for use in the present invention are the alkylsulfate salts such as methosulfate salts, particularly the amine and quaternary ammonium methosulfate salts. Methosulfate salts such as the methyltriethylammonium, tri-n-propylmethylammonium, triamylmethylammonium, tri-n-butylmethylammonium, etc., are very hydroscopic, and the tri-n-butylmethylammonium in particular forms very concentrated aqueous solutions which dissolve large amounts of organic materials. In general the amine and ammonium cations suitable for use in the alkylsulfate salts are the same as those for the sulfonates.

Various other cations are suitable for ues in the present invention, e.g. tetraalkylphosphonium and trialkyl sulfonium cations, particularly as sulfonate salts formed from sulfonic acids as described above, or as methosulfate salts.

When the catholyte during electrolysis is acidic, it will generally be advisable to conduct the electrolysis under conditions which inhibit polymerization of the reactants involved or in the presence of a polymerization inhibitor, for example, in an atmosphere containing sufficient oxygen to inhibit the polymerization in question, or in the presence of inhibitors effective for inhibiting free radical polymerization. Classes of inhibitors for inhibiting free radical polymerizations are well known, e.g., such inhibitors as hydroquinone, p-t-butyl catechol, quinone, p-nitrosodimethylaniline, di-t-butyl hydroquinone, 2,5-dihydroxy-1,4-benzoquinone, 1,4-naphthoquinone, chloranil, 9,10-phenanthraquinone, 4-amino-1-naphthol, etc., are suitable.

The products produced by the processes of the present invention belong to general classes of known compounds of known uses and many of the individual products are known compounds of known uses, and others will have similar properties and uses. The products which are hydrocarbon are useful as solvents and for other similar purposes requiring inert material, and when containing unsaturated groups, can be utilized in various addition reactions such as hydrogenation, chlorination, etc. The products containing cyano, e.g., cyanoethyl groups, can be hydrogenated to amines, etc., as can the products containing carboxamido groups, and the amino groups give the products particular properties or can be used for further reactions. The carboxylate containing groups can be saponified to the free acids or converted to salt groups to aid aqueous solubility or achieve other purposes. The compounds containing pyridine groups will have properties resulting from the amine groups as well as having potential value in biological applications. The compounds containing phosphonate, phosphinate, phosphine oxide and sulfone groups will have improved fire-retardant properties and have potential application as plasticizers or fire retardants for addition to various plastics and resins such as polyurethanes and in various plastic and resinous coating materials, and also be useful as fire resistant hydraulic fluids; such compounds will also be useful as organic intermediates, e.g., the phosphonates and phosphinates can be hydrolyzed by treatment with concentrated acid or other rigorous conditions to obtain the corresponding phosphonic and phosphinic acids, which can be utilized as such or further reacted with other compounds. Keto groups in the various products convey particular properties or can be reduced to alcohols or otherwise utilized as active reaction sites. Various other uses for the products will occur to those skilled in the art.

What is claimed is:

1. The method of producing reduced coupled products of olefinic compounds selected from the group consisting of pyridyl ethylenes having a pyridyl group bonded at the 2- or 4-position, alpha, beta-olefinic ketones, carboxylates, carboxamides, nitriles, phosphonates, phosphinates, phosphine oxides and sulfones with an aryl ethylene having a ring of the aryl moiety bonded directly to the ethylene which comprises subjecting a solution of said olefinic compounds and said aryl ethylene to electrolysis in contact with a cathode and separating the reduced, coupled product from the catholyte.

2. The method of claim 1 in which the aryl ethylene is benzalfluorene.

3. The method of claim 1 in which the aryl ethylene is a phenylbutadiene.

4. The method of claim 1 in which benzalfluorene is reductively coupled with acrylonitrile.

5. The method of claim 1 in which benzalfluorene is reductively coupled with an alkyl acrylate.

6. The method of claim 1 in which 8,8-diphenylbenzofulvene is reductively coupled with acrylonitrile.

7. The method of claim 1 in which the olefinic compound is acrylonitrile.

8. The method of reductive coupling which comprises subjecting an aqueous solution of an olefinic compound selected from the group consisting of pyridyl ethylenes having a pyridyl group bonded at the 2- or 4-position, alpha,beta-olefinic ketones, carboxylates, carboxamides, nitriles, phosphonates, phosphinates, phosphone oxides and sulfones together with an olefinic compound represented by the formula:

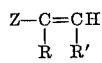

in which Z represents an aryl radical attached at a ring position, and R and R′ are selected from the group consisting of hydrogen and hydrocarbyl radicals to electrolysis in contact with a cathode having a hydrogen overvoltage greater than that of copper, causing development of the cathode potential required for hydrodimerization, the solution containing at least about 10% by weight of unsaturated compounds for coupling and having a pH above about 6, and recovering the resulting reductively coupled compound.

9. The method of claim 1 in which a polymerization inhibitor is present.

10. The method of claim 8 in which an aqueous electrolysis solution is employed and a quaternary ammonium salt constitutes at least 30% by weight of the water and salt, the said salt being soluble in such amounts.

11. The method of claim 8 in which the aryl ethylene and other olefinic compound differ in reduction potential by at least 0.3 volt and the cell voltage is regulated so that the electrolysis occurs at a cathode potential close to that for reduction of the most easily reduced monomer.

12. The method of claim 11 in which the more difficultly reducible monomer is present in large amounts compared to the most easily reduced monomer during the electrolysis.

13. The method of hydrodimerizing 2-phenyl-1,3-butadiene which comprises subjecting an aqueous salt solution of the same to electrolysis in contact with a cathode.

14. The method of hydrodimerizing 9-benzalfluorene which comprises subjecting an aqueous salt solution of the same to electrolysis in contact with a cathode.

15. The method of claim 13 in which acrylonitrile is also present and 6-cyano-3-phenyl-hex-1-ene is an additional product.

16. The method of hydrodimerizing aryl ethenes which comprises electrolyzing an aqueous solution of aryl ethene in contact with a cathode and developing the cathode potential necessary for hydrodimerization, the aqueous solution containing a salt selected from the group consisting of amine and ammonium arylsulfonates and alkylsulfates.

No references cited.

JOHN H. MACK, *Primary Examiner.*

H. M. FLOURNOY, *Assistant Examiner.*